United States Patent [19]

Swain et al.

[11] 4,273,494
[45] Jun. 16, 1981

[54] STORAGE RACK ENTRY VEHICLE

[75] Inventors: James C. Swain; John D. Dickson, both of Columbus; Larry E. Schluer, Sugar Grove, all of Ohio

[73] Assignee: Interlake, Inc., Oak Brook, Ill.

[21] Appl. No.: 946,152

[22] Filed: Sep. 27, 1978

[51] Int. Cl.³ .......................... B65G 65/00; B66B 9/20
[52] U.S. Cl. ................................... 414/266; 187/9 R; 414/284
[58] Field of Search ............................... 414/266–286, 414/241, 243, 254; 180/24.08, 24.12, 72; 187/9 R

[56] References Cited
U.S. PATENT DOCUMENTS

| 2,800,972 | 7/1957 | Jacobson et al. | 180/72 |
| 3,417,879 | 12/1968 | Gough | 414/284 |
| 3,709,383 | 1/1973 | Jenning et al. | 414/284 |
| 3,800,963 | 4/1974 | Hilland | 414/284 |
| 3,880,299 | 4/1975 | Zollinger et al. | 414/284 |

Primary Examiner—Stephen G. Kunin
Assistant Examiner—R. B. Johnson
Attorney, Agent, or Firm—Allegretti, Newitt, Witcoff & McAndrews

[57] ABSTRACT

A storage rack entry vehicle for transporting loads of substantial weight in a warehousing system includes a plurality of wheels spaced from each other in the direction of both the length and the width of the vehicle and which support the vehicle for movement upon rails. The vehicle also includes an elevatable platform which supports the loads on the vehicle and distributes the load weight to locations adjacent each of the wheels. A rigid plate connects both the wheels and the load supports. However, this rigid plate is sufficiently flexible such that the plate flexes to maintain all of the wheels in continuous contact with the rails where one of the rails may vary in elevation such that at least one of the wheels might otherwise move out of contact with the rail surface.

7 Claims, 5 Drawing Figures

STORAGE RACK ENTRY VEHICLE

BACKGROUND AND SUMMARY OF THE INVENTION

This invention relates to a vehicle for transporting loads of substantial weight and, more particularly, to an improved article storage and retrieval storage rack entry vehicle for use in warehousing systems.

A variety of systems have been employed in the past for the storage and retrieval of articles in high volume warehouses. One such system comprises a plurality of storage racks having a plurality of storage bins and in which the racks are separated from each other by aisles. In such system a vehicle having an elevatable platform is movable in the aisles. Forks or the like are carried on the elevatable platform which are extendable from either side of the platform into selected ones of the bins in the storage racks such that an article may either be stored in or retrieved from a particular bin when the elevatable platform is positioned in front of the desired bin. An example of such system is shown in U.S. Pat. No. 3,805,973. The disadvantage of such system is that the density of storage for a storage space of given cubic volume is reduced because of the large number of aisles that must be provided for operation of the storage and retrieval vehicle.

In order to minimize this loss of storage density, various high density storage systems have been devised in which the number of aisles per cubic volume of storage space have been substantially reduced and replaced by storage structure. One such high density system employs storage racks having elongate inclined bins with idler rollers in the bottom of the bins. These bins open at one end and at a slightly higher elevation, to the face of the storage racks where articles are inserted into the bins so as to roll down the inclined idler rollers toward the other, lower retrieval end of the bin. The stored articles are removed, on a first in-first out basis, from the opposite lower elevation end of the rack bins. Another form of high density storage system comprises elongate bins extending from one face to the other of the storage racks, but these bins are substantially horizontal, rather than inclined. In such horizontal bin systems, a rack entry vehicle is employed which moves into the elongate bins in the rack to either store an article in the bins at a designated location or retrieve a designated article from the bin. It is this latter form of high density storage system with which the present invention is concerned.

Rack entry vehicles in such high density systems are subject to several potential problems. For example, the loads which such vehicles must handle are frequently of substantial weight, sometimes as much as 2-3 tons. Moreover, even though the loads handled by the rack entry vehicles are frequently palletized, the loads may still be unevenly distributed. Compounding this problem is the fact that the storage racks in such systems are frequently many stories in height and are of substantial length and width. Accordingly, the racks and the surfaces upon which the rack entry vehicle must operate are subject to distortion not only from contraction and expansion due to temperature variations, but also due to structural settling. The combined result of such unequal weight distribution and distortion frequently results in at least some degree of elevational variation of the rails upon which the race entry vehicle must run. This, in turn, presents a condition wherein one or more of the wheels of the rack entry vehicle may leave their support surface resulting in a loss of traction of the wheels which have left the surface, possible collision of the load with the rack structure during movement of the vehicle in the bins and increased loading on the remaining wheels and their bearings.

Spring loading of the vehicle wheels has been considered to overcome this problem. However, such spring loading is inadequate for several reasons. Spring loading mechanisms are relatively complex and are, thus, subject to maintenance problems. Even more significantly, such spring loading mechanisms are space consuming due to their complexity. This is a significant disadvantage due to the fact that rack entry vehicles are limited in length and width to the dimensions of the pallets or loads which are to be handled, and in height by the distance between the bottom of the load or its pallet and the top of the load in the next lower bin. In fact, the latter distance is usually purposely designed to be a minimum to maximize storage density. Thus, the volume aboard such rack entry vehicles for carrying necessary operational components, such as drive motors for both the horizontal and platform lift drives, electrical circuitry, batteries and other control mechanisms, is at a premium. Accordingly, it is advantageous to reduce or eliminate, if possible, any mechanisms which consume space. Another disadvantage of such spring loading mechanisms is that they may be unstable in wide or poorly distributed load conditions.

In the present invention, the vehicle wheels are maintained in continuous contact with their rolling surfaces without the need for complex spring loading systems. In the present invention, several of the elements or components of the rack entry vehicle which might otherwise have been incorporated in the vehicle anyway, are utilized in a particular configuration to overcome the possibility of the wheels leaving the rails. Thus, space consumption, maintenance and capital expenditure for the components themselves are substantially reduced.

In a principal aspect of the present invention, a vehicle for transporting loads of substantial weight, comprises a plurality of transport means spaced from each other in the direction of both the length and width of the vehicle, the transport means supporting the vehicle for movement upon a surface. Support means are provided for supporting the load on the vehicle and to distribute the weight of the load to locations adjacent each of the transport means. Rigid plate means, connects both the plurality of transport means and the support means, the plate means is sufficiently flexible to flex due to weight of the vehicle and the loads thereon to maintain each of the transport means in continuous contact with the surface when a portion of the surface upon which a given one of the transport means varies in elevation from other portions of the surface upon which the other ones of the transport means rest.

The plate means can be a single sheet or a composite of more than one piece. The main feature is that the plate means provides a rigid, but sufficiently flexible, connection between the various support and transport means of the vehicle to maintain the vehicle wheels in continuous contact with their running surfaces even though these surfaces may vary in elevation.

In another principal aspect of the present invention, a plurality of storage racks for the storage of the loads is provided. The storage racks comprise a plurality of elongate bins for supporting a plurality of the loads therein. Rail means are positioned in each of the bins which extend for substantially the length of the bins and which define the surface upon which the vehicle moves. The aforementioned vehicle is movable over substantially the length of each of the bins for depositing and retrieving loads into and from the bins.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

A perspective partial view of a high density warehousing system is shown of the kind in which a rack entry vehicle incorporating the principles of the present invention may be employed. The high density storage system includes at least one article storage rack structure, generally 10, having a plurality of elongate, generally horizontal storage bins, such as shown at 12–15, on top of and alongside of each other in the rack structure. Each of the bins 12–15 opens to the open front 16 of the storage rack 10. The open front 16 of the rack faces a longitudinal aisle 18 extending across the face of the rack 10. Although not shown, it will be understood that the warehousing system may include additional racks and bins similar to rack 10 and may include more than one aisle.

Figure 1:
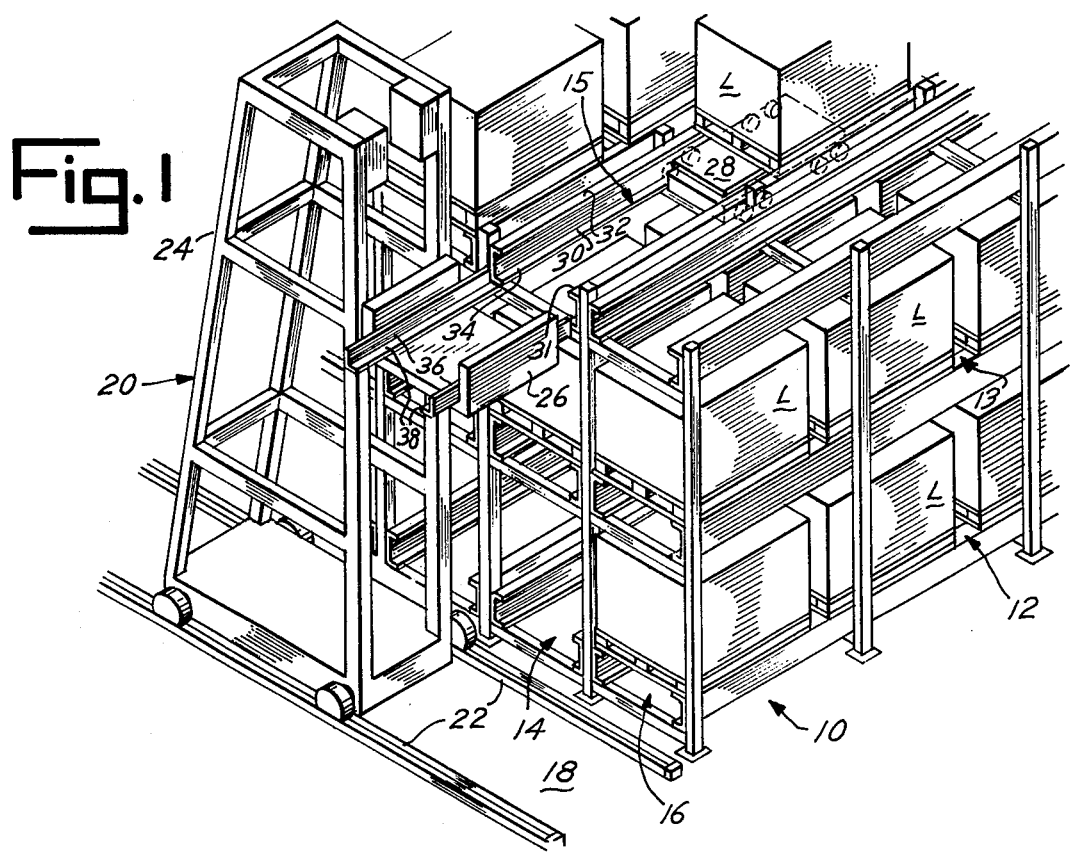
FIG. 1 is a partial perspective view of a high density warehousing system incorporating a storage and retrieval rack entry vehicle constructed in accordance with the principles of the present invention.

A transfer vehicle 20 is located in aisle 18 for operation across the open front 16 of the rack to service the respective elongate bins. The transfer vehicle 20 may either be mounted for overhead operation or for floor operation in the aisle 18. As shown in FIG. 1, the transfer vehicle 20 operates on a pair of spaced parallel floor rails 22. The transfer vehicle 20 may be operated either remotely or by an operator who rides the transfer vehicle, and may be either manually or computer controlled. Details of such controls are not shown because they do not form a part of the present invention. The transfer vehicle 20 includes a mast structure 24 which extends the height of the bins in rack 10. An elevatable platform 26 is mounted on the mast structure 24 for movement up and down the structure and into alignment with given ones of the bins.

A rack entry vehicle 28 is moveable into and out of the rack structure 10 and its bins 12–15 and onto and off the platform 26. Each of the bins as shown in FIG. 1 preferably contains at the bottom thereof a pair of spaced U-shaped channels 30, 31 extending the length of the bins. The upper horizontally extending flange 32 of each of the channels 30 and 31 defines a horizontal surface upon which a palletized load L rests when in storage in the storage rack 10. The horizontally extending lower flange 34 defines a horizontal surface upon which the rack entry vehicle 28 rolls for movement in the bin.

The lift platform 26 also preferably includes a pair of rails 36 of angled construction having a horizontal flange 38 which is adapted to define an upward facing rail surface for receipt of the rack entry vehicle upon the lift platform. This upper surface of flange 38 is alignable with the horizontal surfaces 34 of channels 30 and 31 in each of the bins.

The system thus far described is essentially conventional in rack entry vehicle high density storage systems. A description of the construction of the rack entry vehicle itself which forms the novel subject matter of the present invention will now follow.

The rack entry vehicle 28 of the present invention is constructed in generally box form as shown in FIGS. 2–5. The box includes a rectangular, rigid bottom plate 40 having a length and width substantially equal to the length and width of the rack entry vehicle. The rack entry vehicle itself is substantially equal in length and width to the length and width of the loads to be handled by the vehicle. A tubular, hollow, square beam member 42 is fixed to the top of the plate 40 by suitable means, such as welding, and such that it actually becomes an integral part of the plate 40. Square beam member 42 extends about the perimeter of the plate 40 and is also substantially equal in length and width to the plate 40. The beam member 42 adds some additional rigidity to the plate 40 as will be described in further detail later. However, the beam member together with the plate member are still sufficiently flexible to allow sufficient flexing as will be described in more detail to follow.

Figure 2:
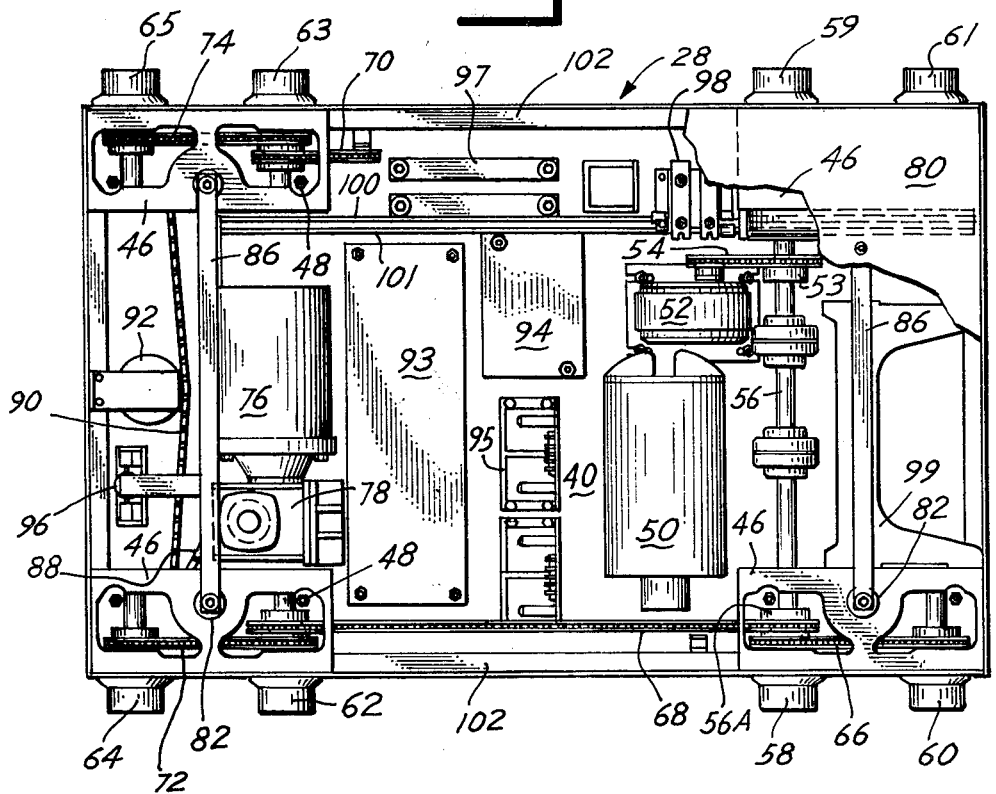
FIG. 2 is a partially broken, plan view of a storage and retrieval rack entry vehicle incorporating the principles of the present invention.
Figure 3:
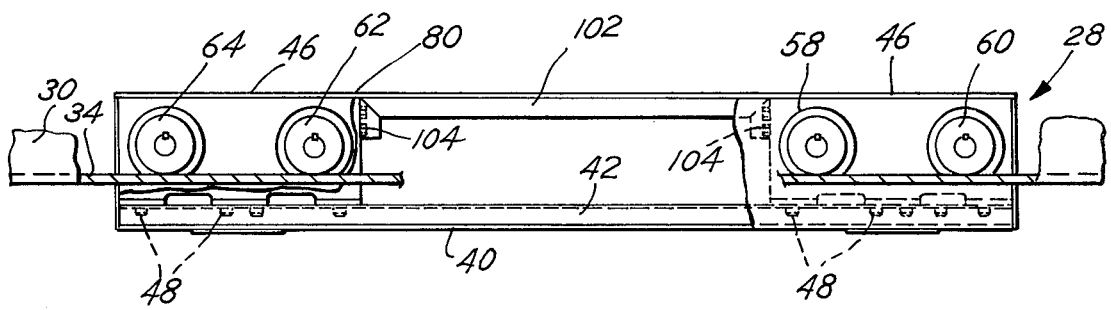
FIG. 3 is a partially broken, side elevation view of the vehicle shown in FIG. 2.
Figure 5:
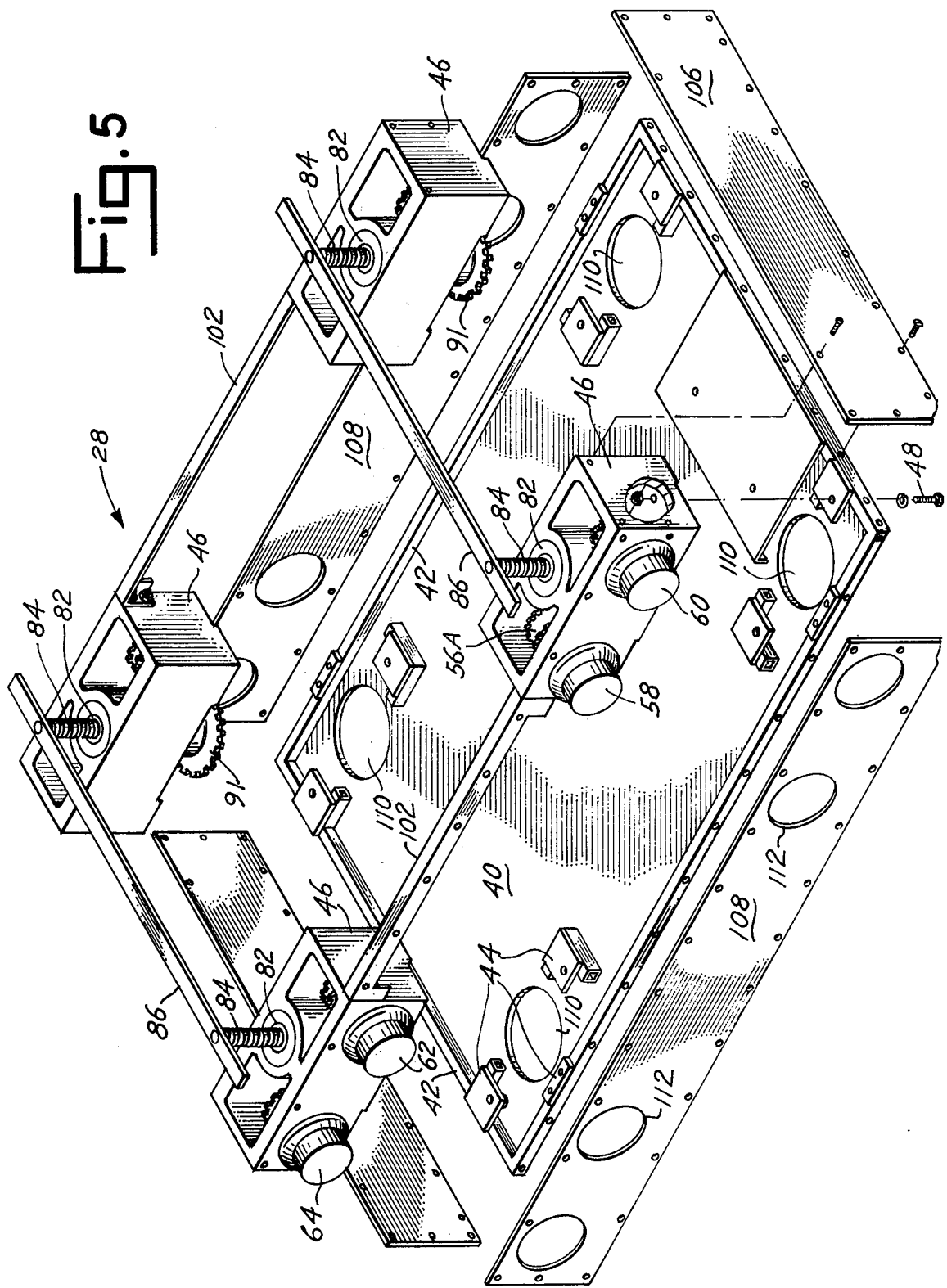
FIG. 5 is an exploded view of the vehicle shown in FIG. 2 with the load platform and other mechanical components removed for a clearer understanding of the invention.

A number of mounts for various component equipments are firmly fixed to either the plate 40, the beam member 42 or both as shown in FIGS. 2 and 5. As shown in FIG. 5, such mountings preferably include three lift and drive assembly box mountings 44 at each of the respective corners of the plate 40. Rigid, preferably cast, lift and drive box assemblies 46 are mounted on mountings 44 by suitable means, such as bolts 48 as shown in FIGS. 2 and 3. When mounted, the lift and drive box assemblies 46 are contained within the perimeter of the plate 40.

A vehicle drive motor 50 and its reduction gear 52 are also mounted to the plate 40 as shown in FIG. 2. A drive chain 54 extends from the reduction gear 52 to a sprocket 53 on a drive shaft 56. Drive shaft 56 is mounted for rotation and extends across the width of the vehicle and into two of the lift and the drive box assemblies 46 as shown in FIG. 2, where it is coupled directly to a transport means for the vehicle, e.g. a pair of vehicle drive wheels 58 and 59 on opposite sides of the vehicle. In addition, each of these two lift and drive box assemblies 46 may include an additional set of wheels 60 and 61. The remaining lift and drive box assemblies 46 at the other end of the vehicle also preferably each include a pair of driven transport means, e.g. wheels 62, 63, 64, 65. These wheels are adapted to engage with and roll upon the upper surfaces of the horizontal flanges 34 of channels 30 and 31 and upper surfaces of flanges 38 of rails 36 on the platform 26.

A pair of drive sprockets 56A are also positioned at each end of drive shaft 56 in each of the opposite lift and drive box assemblies as shown in FIG. 2. One of these sprockets receives a drive chain 66 which extends so as to engage a sprocket on wheel 60 to drive wheel 60. Although not shown in FIG. 2, a chain corresponding to chain 66 is also provided to drive wheel 61. A pair of longer chains 68 and 70 are positioned on each of the other sprockets at each end of drive shaft 56. Chains 68 and 70 extend longitudinally down each side of the vehicle and around a driven sprocket on wheels 62 and 63, respectively, in the other remaining lift and drive box assemblies 46 to drive wheels 62 and 63. Drive chains 72 and 74 are driven from the shafts of wheels 62 and 63, respectively, and, in turn, drive wheels 64 and 65. With the exception of drive shaft 56, none of the shafts of the remaining wheels extends across the width of the vehicle. The drive shafts of wheels 60, 61, 62, 63, 64 and 65 are preferably contained within their respective lift and drive box assemblies 46. Such drive construction not only provides additional space in the vehicle in which various operating mechanisms may be contained, but also allows flexing and twisting of the vehicle, as will be more fully described later, without loss of power or jamming of the drive train. All of the vehicle wheels 58–65 are preferably powered to assure continuing movement of the vehicle in the event that one or more of the wheels leave the rails such as when the vehicle is moving between a bin and platform 26, and also to minimize the tendency of the vehicle to turn which might result from unequal application of drive power.

A lift motor 76 and its associated reduction gear 78 are also contained on the vehicle as shown in FIG. 2 for elevation of the load carrying platform 80 of the vehicle. Four linear ball screw actuators 82 are provided, one each, in each of the lift and drive box assemblies 46 adjacent the wheels 58–65. Each of the actuators 82 includes a screw gear 84 which supports the platform 80 and load L and distributes the weight of the load to a location adjacent the wheels 58–65, i.e. to the rigid lift and drive box assemblies 46. The screw gear 84 is adapted to be driven into and out of the ball screw actuator 82 to raise the platform 80 to the position shown in FIG. 4 or lower the platform to cover the top of the vehicle and to rest on the tops of the several lift and drive box assemblies 46. A pair of tie bars 86 extend across the vehicle. One of the tie bars couples together the tops of the screw gears 84 at one end of the vehicle and the other tie bar couples the tops of the screw gears at the other end of the vehicle as shown in FIG. 5. The lift platform plate 80, in turn, rests upon the tie bars 86 and is coupled to the tops of each of the screw gears 84.

A drive chain 88 is coupled between the reduction gear 78 of the lift motor 76 and one of the ball screw actuators 82. A portion of drive chain 88 is shown in FIG. 2. A drive chain loop 90, in turn, is coupled by another sprocket (not shown) to the linear ball screw actuator to which drive chain 88 is coupled, and passes around sprockets 91 on all of the remaining linear ball screw actuators 82, as shown partially in FIGS. 2 and 5. By using the loop drive chain 90, uniform and simultaneous elevation of all of the screw gears 84 is insured to avoid tilting of the platform 80 during raising and lowering. A drive chain tightener 92 may also be provided as necessary to take up any slack in the drive chain loop 90.

A number of other components may also be mounted to the plate 40 such as are necessary for the operation of the rack entry vehicle. By way of example, some of these components are shown in FIG. 2 and may include a battery 93, controls 94, motor contactor controls 95, travel limit switches 96, charger pickup installations 97 for charging the battery, circuit breakers 98, and suitable signal receiving and processing components 99 for controlling the operation of the vehicles in the bins. In addition, mechanical couplings 100 and 101 may be provided which are accessible from the exterior of the vehicle for resetting the circuit breakers and brakes of the vehicle. These latter several components are mentioned by way of example only and do not specifically constitute critical elements of the invention, except to the extent that they demonstrate the competition for space for such components which exists in a typical rack entry vehicle.

The rack entry vehicle 28 may be controlled for positioning in the bins either from the transfer vehicle 20 by an operator or remotely by computer. Such control signals may be transmitted to the vehicle in the bin by any one of several means including an umbilical, conductor busses in the bin or by electromagnetic transmissions, such as radio beams, light, etc. It is conceivable that the method of control may also require additional components to be present on the vehicle, such as umbilical cord reels or signal transmission and receiving components. Such additional components, of course, would also compete for the space available on the vehicle. The particular method of control of the vehicle does not form a part of the present invention.

Referring again to FIGS. 2, 3 and 5, an angle iron stringer member 102 preferably extends fore and aft between the tops of pairs of the lift and drive box assemblies 46 on each side of the vehicle. The stringer members 102 are attached to the respective lift and drive box assemblies 46 by suitable means, such as bolts 104 as shown in FIG. 3. The stringer members 102 further reinforce the assembly against bending about an axis parallel to the width of the vehicle. The tie bars 86 reinforce the vehicle against the bending along an axis parallel to the length of the vehicle.

The box-like construction of the vehicle is completed by pairs of end panels 106 and side panels 108. These panels are fixed to the vehicle to prevent the entry of dirt and protect the components within the vehicle. The end plates 106 are preferably bolted to the end beams 42 and the ends of the lift and drive box assemblies 46. The side plates 108 are preferably bolted to the side beams 42, the sides of the lift and drive box assemblies 46 and stringers 102. Although the end plates 106 and side plates 108 may to some extent enter into the overall torsion characteristics of the vehicle, they are not principally intended for this purpose, the plate 40 and its integral beam 42 having this purpose.

Openings 110, adapted to be closed with suitable dust plates (not shown), may be provided in plate 40 beneath each of the lift and drive box assemblies 46 to allow access to the various sprocket gears in these assemblies. Openings 112 are also preferably provided in the side plates 108 to accommodate the drive wheels 58–65 as shown in FIG. 5. Other openings (not shown) may also be provided in the end plates 106, side plates 108 or bottom plate 40 to accommodate various other components such as signal sensors or mechanical couplings 100, 101.

Figure 4:
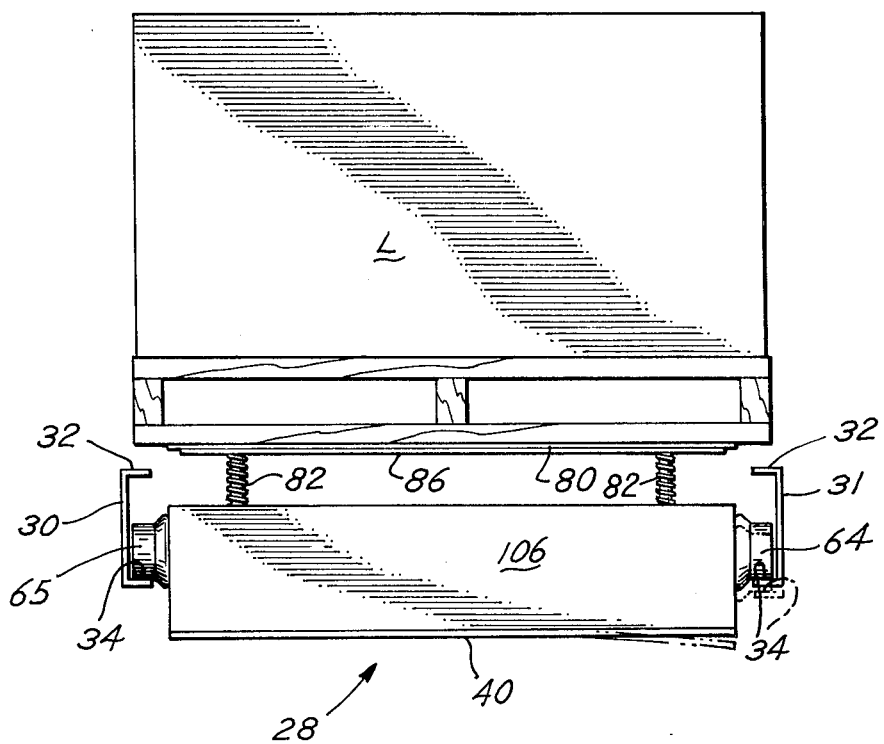
FIG. 4 is an end elevation view of the vehicle shown in FIG. 2 in which the vehicle is loaded and in readiness for deposit of the load in the storage racks, and also showing deflection of the vehicle which might be encountered in normal operation of the present invention.

When the platform 80 is lowered so as to rest on the tops of the lift and drive box assemblies 46, it protects the several components in the vehicle from damage and dirt. However, when the platform 80 is raised as shown in FIG. 4, some measure of that protection is lost. If necessary, a thin cover of mesh or sheet metal (not shown) may be mounted on the tops of the lift and drive box assemblies 46 to provide additional protection for the components in the vehicle.

To retrieve a load L in the storage rack 10, the transfer vehicle 20 will first be positioned adjacent the bin from which it is desired to retrieve the load L. The lift platform 26 will also be elevated with the vehicle 28 on it until the horizontal surface 38 of its rails 36 is in alignment with the horizontal surfaces 34 of the channels 30 and 31 in the bin desired, for example bin 15 in FIG. 1. The rack entry vehicle 28 of the invention is then dispatched into the bin and leaves the platform 26. Although there may be a gap between surfaces 38 on the lift platform and 34 in the bin, continuing drive power is assured because all of the wheels of the vehicle 28 are driven. The vehicle 28 proceeds to an ordered location in the bin until it is positioned beneath the load L to be retrieved. At that time a suitable command is transmitted to the vehicle 28 and the vehicle stops beneath the load. When stopped, the lift motor 76 is energized to elevate the platform 80 to the position shown in FIG. 4 and into contact with the bottom of the pallet upon which the load rests. Further elevation of platform 80 by ball screw actuators 82 and screw gears 84 lifts the pallet and its load free of the upper horizontal flanges 32 of channels 30 and 31 upon which it previously rested. The vehicle is then ordered to withdraw from the bin and returns to the platform 26 with the load L thereon.

If it is desired to deposit a load in the bin, the operation is simply reversed. The vehicle 28 with the load L thereon and elevated as shown in FIG. 4, leaves the lift platform 26 and rolls along flanges 34 in the bin until it reaches the destination where the load L is to be deposited. When it reaches its destination, the vehicle is signalled to stop and platform 80 is lowered until the bottom of the load L rests upon upper horizontal flanges 32 of channels 30 and 31. The platform 80 is further lowered until it clears the bottom of the load and the empty vehicle is withdrawn from the bin back to the platform 26.

During operation in the bins or upon transition from the surfaces 38 on the lift platform to surfaces 34 in the bin, one of the drive wheels 58-65 may move out of contact with the surface upon which it would otherwise roll. This may occur, for example, because of settling of one of the channels 30 or 31. If one or more of the drive wheels leaves the flanges 34, traction is substantially reduced and the vehicle may unpredictably tip or tilt which may cause impact of the load with the storage racks. The purpose of the present invention is to insure that the drive wheels at all times contact their rolling surfaces and yet avoid elaborate, complex, space consuming mechanisms for achieving this purpose. To achieve this purpose, the present invention relies upon flexure of the bottom plate 40 and its integral beam 42 upon which each of the rigid lift and drive box assemblies 46 is directly mounted in each of the corners. Each of the lift and drive box assemblies 46 comprises a rigid casting and, as such, each directly receives both the weight of the load L from each of the linear ball screw actuators 82 and screw gears 84 and also supports the weight of the vehicle and the load via the rollers 58-65. Both of these forces are transmitted through the rigid lift and drive box assemblies 46 at the corners of the vehicle directly to the plate 40 and square beams 42. Thus, the plate 40 actually produces a springing action which converts the forces imparted to the lift and drive box assemblies 46 into flexing action which tends to maintain the wheels 58-65 against the surfaces 34 on which they are rolling in the event that a portion of one of the surfaces upon which a given one of the drive wheels rests varies in elevation from other portions of the surfaces upon which the other wheels rest.

To avoid excessively increasing the weight of the vehicle, the peripherally located square beam element 42 is preferably included as part of the plate construction to increase the rigidity of what might be an otherwise excessively springy, flexible plate 40. In any event, the beam 42 does not increase the rigidity of the plate to the extent that the desired springing, twisting action does not occur. It will be understood that the desired amount of springing action may be achieved by means other than by forming the square beam 42 integrally with the plate 40, such as by increasing the plate thickness. However, such increase of the plate thickness substantially increases the weight of the vehicle. Thus, by employing beam element 42, the vehicle weight may be substantially reduced while satisfactorily controlling the degree of springing action. By way of example, for a vehicle designed to handle loads of up to 4,000 pounds and having a vehicle weight per se of approximately 1,000 pounds, it has been found that a ¼ inch thick hot rolled steel plate 40 with tempered steel beams 42 one inch square in cross section and having a wall thickness of 0.083 inch results in the desired rigidity, yet flexibility sought by the present invention.

The sprocket and chain construction disclosed herein for the drive and lift assemblies is also preferred over gear drives. The sprocket and chain construction allows for the twisting of plate 40 without causing binding and wear in the drive train which might otherwise occur in gear drive trains. Moreover, by extending the chains 68 and 70 from the drive shaft 56 toward the lift and drive box assemblies 46 at the other end of the vehicle, uniform drive torque is applied to all of the drive wheels 58-65, thereby avoiding undesirable twisting torsion of the vehicle during operation.

It will be understood that the embodiment of the present invention which has been described is merely illustrative of one of the applications and principles of the invention. Numerous modifications may be made by those skilled in the art without departing from the true spirit and scope of the invention.

What is claimed is:

1. A vehicle for transporting loads of substantial weight and adapted to operate on a surface comprising:
   a substantially continuous rectangular flexible plate means having a major planar area substantially horizontal and parallel to said surface,
   a plurality of rigid box means mounted directly upon and supported by said plate means adjacent each corner thereof,
   transport means mounted on each of said rigid box means and supporting the vehicle for movement upon said surface,
   means for supporting a load on the vehicle including elevation changing means for changing the elevation of the load on the vehicle, means mounting said elevation changing means on each of said rigid box means, said plate means being sufficiently flexible to flex due to the weight of the vehicle and the load thereon to effect vertical movement of ones of said rigid box means and their respective transport means and elevation changing means independently of other ones of said rigid box means and their respective transport means and elevation changing means to permit said transport means to move toward and remain in continuous contact with said surface upon which said transport means move when a portion of the surface upon which a given one of said transport means is in contact varies in elevation from other portions of the surface upon which the other of said transport means are in contact.

2. The vehicle of claim 1 wherein said plate means is beneath said rigid box means and said rigid box means are mounted thereon.

3. The vehicle of claim 1 including drive means mounted on said vehicle, said drive means including drive chain means extending the length and along each side of the vehicle, all of said transport means being driven by said chain means.

4. The vehicle of claim 1 wherein said transport means comprise wheels which support said vehicle for rolling movement upon said surface.

5. The vehicle of claim 1 wherein said surface comprises at least a pair of rails.

6. The vehicle of claim 1 wherein said plate means includes a plate and beam means simultaneously connecting said rigid box means, said beam means being mounted on said plate so as to become an integral part of said plate.

7. The vehicle of claim 1 including in combination therewith, a plurality of storage racks for the storage of said loads, said storage racks comprising a plurality of elongate bins for supporting a plurality of said loads therein, rail means extending for substantially the length of each of said bins and defining said surface upon which said vehicle moves, said vehicle being movable over substantially the length of each of said bins for depositing and retrieving said loads into and from said bins.

* * * * *